United States Patent [19]
Beck

[11] 3,777,783
[45] Dec. 11, 1973

[54] VALVE AND METHOD OF MAKING THE SAME

[75] Inventor: Maurice E. Beck, Fort Wayne, Ind.

[73] Assignee: Kunkle Valve Co., Inc., Fort Wayne, Ind.

[22] Filed: Oct. 6, 1971

[21] Appl. No.: 187,031

[52] U.S. Cl.............. 137/625.5, 251/366, 251/368, 29/421 M
[51] Int. Cl............................................. F16k 11/00
[58] Field of Search............................... 137/625.5; 29/157.1 R, 421 M; 285/332.4, 334.5, 382; 251/367, 366

[56] References Cited
UNITED STATES PATENTS

| | | | |
|---|---|---|---|
| 3,593,745 | 7/1971 | Myers | 137/625.5 X |
| 3,662,761 | 5/1972 | Hoffman | 29/157.1 R |
| 2,976,907 | 3/1961 | Harvey et al. | 29/421 M |
| 3,196,529 | 7/1965 | Schwinghamer | 29/421 M |
| 3,214,511 | 10/1965 | Franklin | 29/421 M |
| 3,602,531 | 8/1971 | Patry | 285/328 X |
| 3,032,310 | 5/1962 | Hansen | 29/157.1 R |
| 3,122,065 | 2/1964 | Laun | 137/625.5 X |
| 3,578,286 | 5/1971 | Klimek | 29/157.1 R |
| 2,892,608 | 6/1959 | Collins | 251/367 X |
| 3,333,327 | 8/1967 | Larsen | 29/421 M |

Primary Examiner—Samuel Scott
Attorney—Harold B. Hood et al.

[57] ABSTRACT

A double seat valve having a valve body formed of conductive metal with a relatively thin-wall top portion forming the side wall of an open ended cavity, and a bottom portion having a chamber therein communicating with the cavity. The bottom portion has first and second axially displaced ports communicating with the chamber, and a first valve seat in the chamber between the first and second ports. A valve top member has a portion extending into the cavity, that portion having a bottom end closing the chamber, and an upwardly and inwardly tapered surface facing the wall. The wall is deformed into tight engagement with the tapered surface by forces created by a transient magnetic field of high intensity. The top member has an axial passage therethrough communicating with the chamber through the bottom end which has a second valve seat formed therein, and a third port communicating with the passage. A valve member is positioned between the first and second seats and is secured to a valve stem which extends through the passage, and which actuates the valve member between a first position in which it engages the first seat thereby blocking flow between the first and second ports and permitting flow between the second and third ports, and a second position in which it engages the second seat thereby blocking flow between the second and third ports and permitting flow between the first and second ports.

12 Claims, 12 Drawing Figures

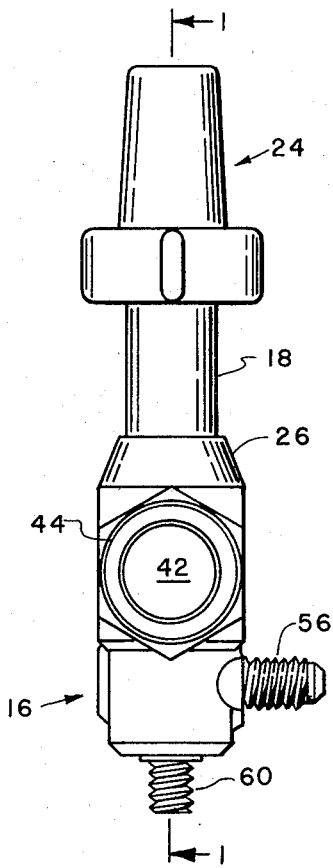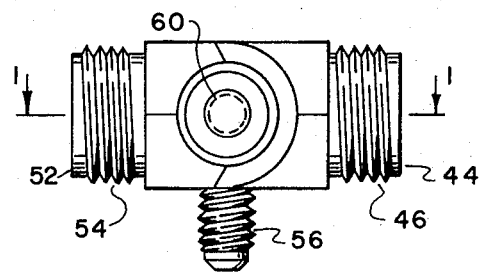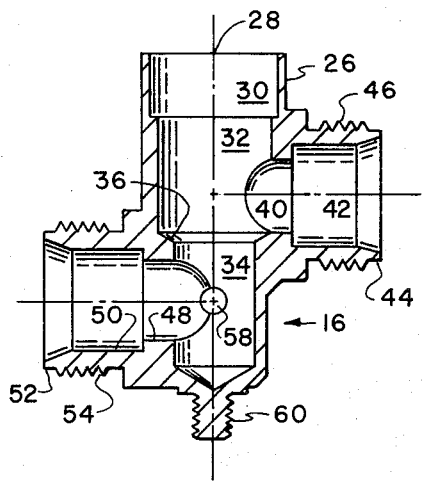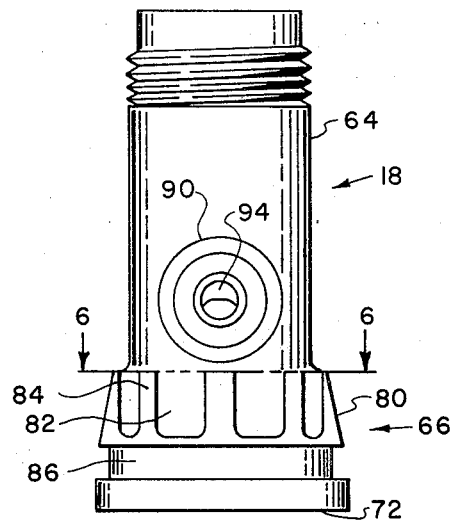

INVENTOR:
MAURICE E. BECK
BY; Hood, Gust, Irish,
Lundy & Coffey
ATTORNEYS

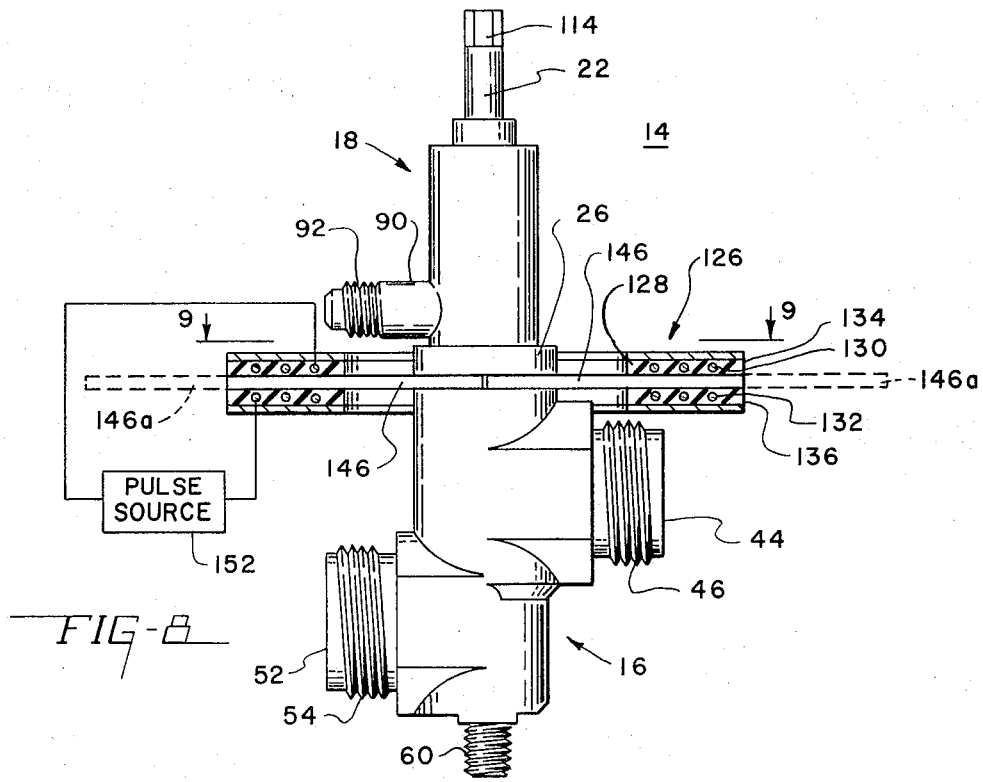
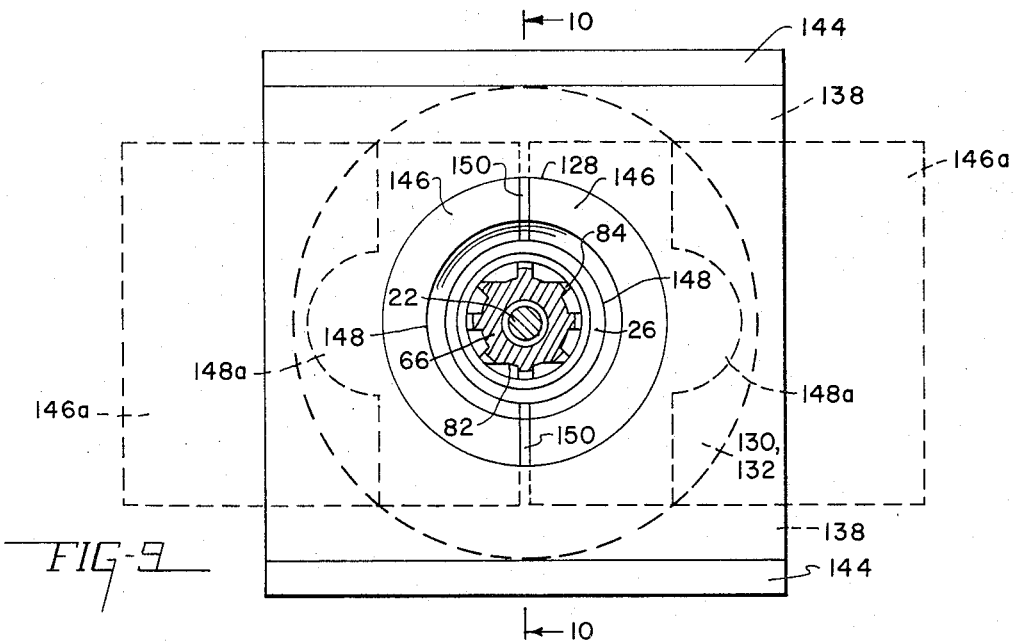
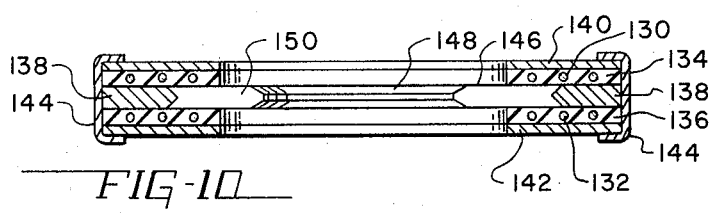

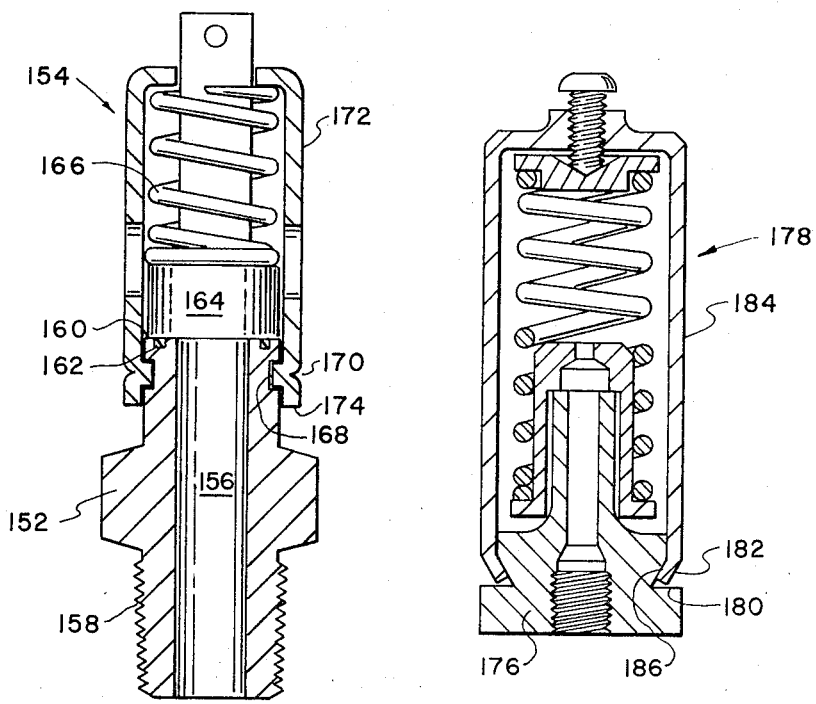

VALVE AND METHOD OF MAKING THE SAME

BACKGROUND OF THE INVENTION

1. Field of the Invention

This invention relates generally to valve assemblies and methods of making the same, and more particularly to a double seat valve assembly and method of making the same.

2. Description of the Prior Art

Double seat valves which are commonly used in refrigeration systems comprise three ports with a valve member selectively actuable between a first position in which flow is blocked between a first and second port and permitted between the second and third port, and a second position in which flow is blocked between the second and third port and permitted between the first and second port. One form of double seat valve and a method of making the same is disclosed in U.S. Pat. No. 2,536,727. In that valve assembly, first and second nipples having passages therein forming first and second ports are attached to the valve body by brazing, and a third nipple having a passage therein forming the third port is attached to the valve body by silver soldering.

In another known form of double seat valve, the first, second and third nipples are integrally formed on the valve body, two of the nipples having passages therein directly communicating with the valve chamber. A valve top member having a passage therein which communicates with the passage in the third nipple is attached to the valve body by silver soldering.

The attachment of one valve part to another by a silver soldering, which involves heating the area to be soldered to an elevated temperature, may cause distortion and adversely affect the previously assembled packings. In the case of aluminum and brass valves, the flux used in silver soldering may adversely affect the enclosed areas of the valve. Further, silver soldering is a manual operation requiring some dexterity.

In the case of the second known form of double seat valve referred to above, problems are presented in aligning the passage in the third nipple with the passage in the valve top member. Further, the silver solder employed in securing the top member to the valve body tends to block those passages thus requiring that they be drilled-out, which may result in the presence of shavings in the interior of the valve.

Valve parts have been held in an assembled relation by threaded connections however, such threaded connections tend to leak after a period of time which is particularly undesirable in the case of a valve employed in a refrigeration system where maintenance-free operation for a number of years is desired.

It is therefore desirable to provide a valve assembly and method of making the same in which the valve parts are held in assembled relation without a threaded connection of the necessity for heating the parts as in soldering or brazing.

Apparatus and methods have been developed for forming metals by application of transient magnetic fields of high intensity, and such apparatus and methods have been employed for attaching one part to another. Such an electromagnetic metal forming apparatus and method as disclosed in U.S. Pat. Nos. 2,976,907 and 3,429,159. In accordance with that apparatus and method, a momentary electrical current pulse of high amperage is applied to a conductive coil thereby producing a transient magnetic field of high intensity. A conductive work piece positioned in the field has eddy currents induced therein in response to the expanding field, the induced current pulse in the work piece interacting with the magnetic field to produce a force acting on the work piece. When the peak value of the current pulse is high, for example in the range from 100,000 to 1,000,000 amperes, such as that provided by discharge of a capacitor bank, deformation of the work piece is obtained, the shape of the deformation being dependent upon the configuration of the magnetic field and the position of the work piece relative thereto.

SUMMARY OF THE INVENTION

In accordance with the invention, valve parts are secured in assembled relation by deformation of one part caused by forces created by a transient magnetic field of high intensity.

In its broader aspects, the invention provides a valve assembly comprising a first part formed of conductive metal and having a relatively thin-wall portion forming the side wall of an open ended cavity. A second part is provided having a portion extending into the cavity, the second part portion having means thereon facing the wall for holding the first and second parts in assembled relation. The wall is deformed into tight engagement with the holding means by forces created by a transient magnetic field of high intensity.

It is accordingly an object of the invention to provide an improved valve assembly.

Another object of the invention is to provide an improved double seat valve assembly.

A further object of the invention is to provide an improved method of making a valve assembly.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a side view of the valve of FIG. 1 as viewed generally along the line 2—2 thereof;

FIG. 3 is a bottom view of the valve of FIG. 1 as viewed generally along the line 3—3 thereof;

FIG. 4 is a side cross-sectional view of the body of the valve of FIG. 1 prior to assembly;

FIG. 5 is a front view of the top member of the valve of FIG. 1 prior to assembly;

FIG. 8 is a side elevational view, partly in cross section, illustrating the improved method of assembly of the valve of FIG. 1;

FIG. 9 is a cross-sectional view taken generally along the line 9—9 of FIG. 8;

FIG. 10 is a cross-sectional view of the electromagnetic metal deforming apparatus employed taken generally along the line 10—10 of FIG. 9;

FIG. 11 is a side cross-sectional view showing a safety valve assembled in accordance with the method of the invention; and FIG. 12 is a side cross-sectional view showing a relief valve assembled by the method of the invention.

DESCRIPTION OF THE PREFERRED EMBODIMENTS

Figure 1:
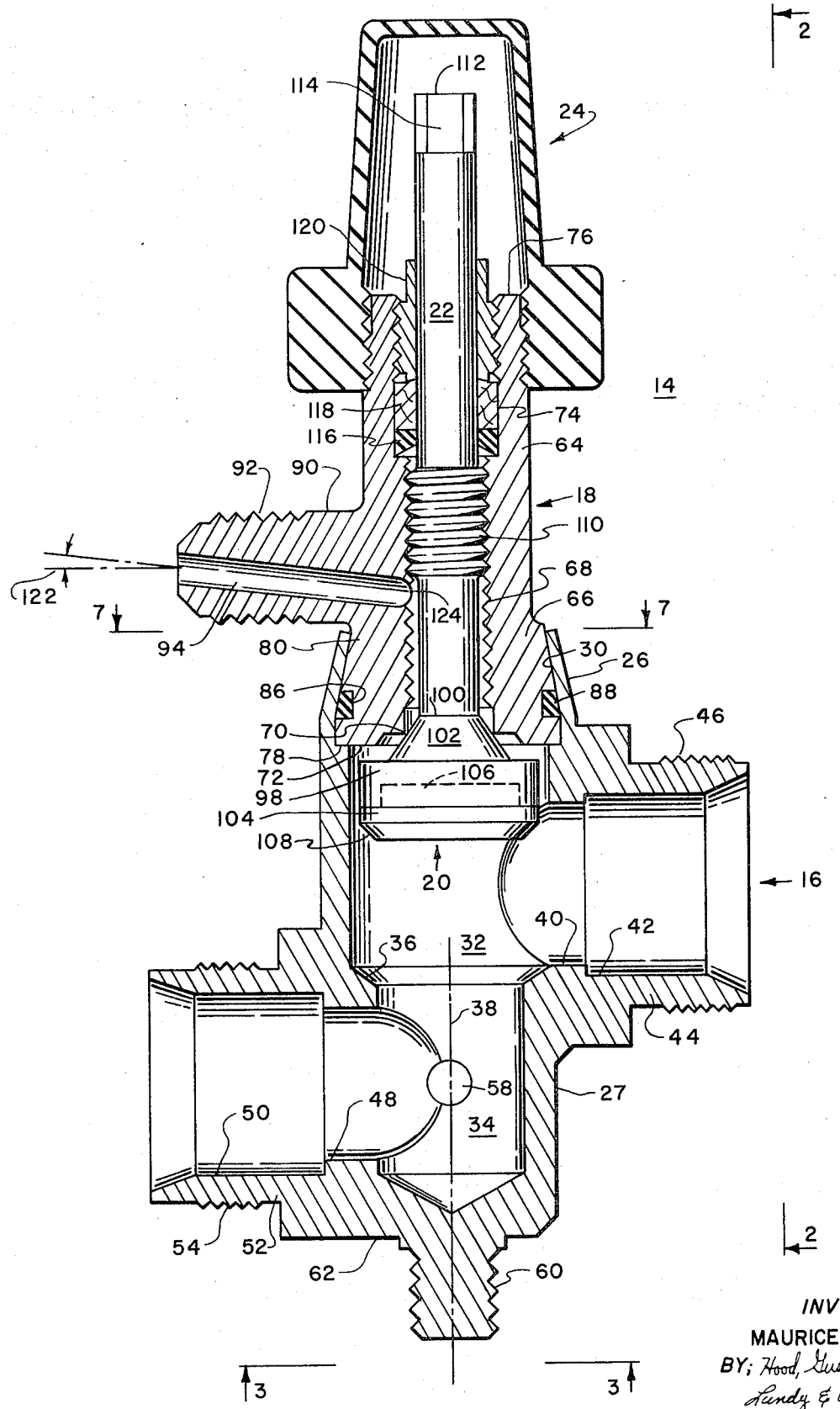
FIG. 1 is a side cross-sectional view showing the improved double seat valve assembly of the invention.
Figure 6:
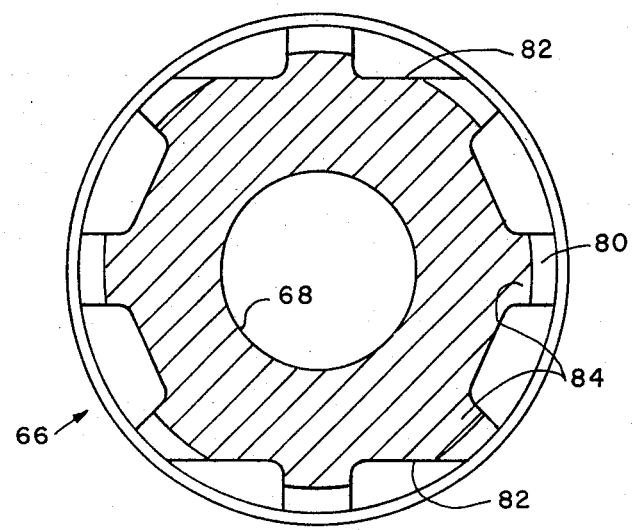
FIG. 6 is a cross-sectional view taken generally along the line 6—6 of FIG. 5.

Referring now to FIGS. 1 through 7 of the drawings, the improved double seat valve of the invention, generally indicated at 14, comprises valve body 16 formed of conductive metal, such as aluminum, valve top 18, also formed of metal, such as aluminum, valve member 20 actuated by valve stem 22, and cap 24.

Valve body 16 has an annular, relatively thin-walled top portion 26 extending downwardly from its upper end 28 and defining cavity 30 (FIG. 4). Bottom portion 27 of valve body 16 has a valve chamber formed therein comprising upper and lower chamber sections 32, 34 with first valve seat 36 therebetween, upper chamber section 32 communicating with cavity 30. Longitudinal axis 38 of valve body 16 extends through cavity 30 and chamber sections 32, 34. First port 40 communicates with upper chamber section 32 and with passage 42 in nipple 44 having external threads 46 thereon. Second port 48 communicates with lower chamber section 34 and with passage 50 in nipple 52 having external threads 54 thereon. Another externally threaded nipple 56 (FIGS. 2, 3) has passage 58 therein also communicating with lower chamber section 34. Externally threaded stud 60 is integrally formed on bottom end 62 of body 16 and may be employed for mounting valve assembly 14.

Valve top member 18 comprises upper portion 64 and lower portions 66 and has internally threaded, axial passage 68 formed therein. Passage 68 extends between second valve seat 70 formed in bottom end 72 and enlarged passage 74 extending downwardly from upper end 76.

Lower portion 66 of valve top member 18 extends into cavity 30 in valve body 16 with its bottom end 72 seated against shoulder 78. Lower portion 66 of valve top member 18 has surface 80 thereon which tapers upwardly and inwardly toward axis 38 and which also has axially extending grooves 82 formed therein (FIGS. 6 and 7) defining splines 84 therebetween. Annular groove 86 is formed in lower portion 66 of top member 18 between tapered surface 80 and bottom end 72 and has O-ring 88 seated therein.

Figure 7:
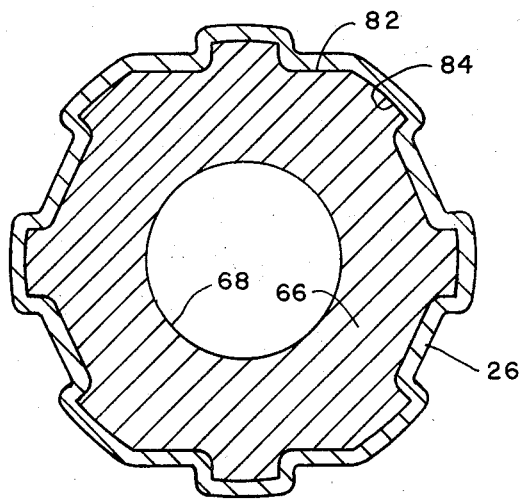
FIG. 7 is a cross-sectional view taken generally along the line 7—7 of FIG. 1.

As hereinafter more fully described, wall 26 of valve body 16 is deformed for forces created by a transient magnetic field of high intensity into tight engagement with splines 84 and grooves 82, as best seen in FIG. 7, thereby compressing O-ring 88 and holding valve body 16 and valve top member 18 in assembled relation. It will be seen that deformation of wall 26 into engagement with grooves 82 and splines 84 of lower portion 66 of top member 18 inhibits rotation of top member 18 with respect to valve body 16.

Nipple 90 having external threads 92 thereon is formed on upper portion 64 of valve top member 18 and has passage 94 therein communicating with passage 68 thereby forming a third port. Valve stem 22 has valve mounting portion 98 integrally joined to its lower end 100 by tapered portion 102. Valve disc 104 formed of suitable material, such as nylon, has portion 106 seated in a recess in valve mounting member 98 and secured thereto by suitable adhesive. Valve disc 104 has tapered surface 108 adapted sealingly to engage valve seat 36. As best seen in FIG. 1, valve mounting member 98, tapered portion 102 of valve stem 22, and valve disc 104 are positioned in upper chamber section 32 of valve block 16.

Valve stem 22 has threaded portion 110 thereon intermediate its ends 100, 112 which threadedly engages internally threaded passage 68 thereby permitting actuation of valve 20 between an upper position, as shown, with tapered portion 102 engaging valve seat 70, and a lower position in which tapered portion 108 of valve disc 104 engages valve seat 36. It will readily be seen that in the upper position of valve 20 shown in FIG. 1, fluid flow between ports 40 and 94 is blocked whereas fluid flow between ports 40 and 48 is permitted. It will further be seen that with valve 20 in its lower position sealingly engaging valve seat 36, fluid flow between ports 40 and 48 is blocked whereas fluid flow between ports 40 and 94 is permitted.

Upper end 112 of valve stem 22 extends upwardly above upper end 76 of valve top member 18, and valve stem 22 is adapted to be manually rotated thereby to actuate valve 20 between its upper and lower positions by hex portion 114 adjacent upper end 112. Leakage of fluid along valve stem 22 is prevented by washer 116 and packing 118 in enlarged passage portion 74, washer 116 and packing 118 being compressed and retained by nut 120, as shown. Closure cap member 24 threadedly engages upper end 76 of valve top member 18 thus enclosing upper end 112 of valve stem 22 and providing additional sealing.

In the embodiment illustrated in FIG. 1, passage 94 is preferably inclined inwardly and downwardly by a small angle 122, such as 3°, so that its opening 124 into passage 68 will be below threaded portion 110 of valve stem 22 when in its upper position.

The double seat valve assembly 14 is particularly adapted for use in a refrigeration system, and when used in such a system, the normal flow of refrigerant is from passage 50 and port 48 to port 40 and passage 42. A pressure gauge is coupled to nipple 90, and nipple 56 is adapted for use in charging the system, passage 58 having a check valve (not shown) therein.

Referring now to FIGS. 8, 9 and 10, valve top member 18, with valve stem 22 and valve 20 assembled thereon, may be assembled on valve body 16 using magnetic forming apparatus 126 of the general type shown in U.S. Pat. No. 3,429,159. Apparatus 126 has a central opening 128 therein having a diameter greater than the maximum transverse dimension of nipple 90 and valve top member 18 thereby permitting the assembled valve body 16 and valve top member 18 to be inserted in and removed from apparatus 126.

Apparatus 126 comprises a pair of pancake coils 130, 132 respectively embedded in members 134, 136 formed of suitable insulating material. Insulating members 134, 136 respectively abut guide members 138, metal plates 140, 142 respectively abut the outer surfaces of members 134, 136, and members 134, 136, 138 and plates 140, 142 are held in assembled relation by suitable clamps 144.

Field shaping plates 146 formed of conductive metal, such as copper, are slideably mounted on guide members 138 for lateral movement between an inner position, as shown in solid lines of FIGS. 8 and 9, and an outer position as shown in dashed lines at 146a. Field shaping plates 146 have arcuate apertures 148 formed therein which respectively engage wall 26 of valve body 16 when field shaping members 146 are in their inner positions, as shown. Field shaping members 146 are slightly spaced apart in their inner positions to form an air gap by a narrow strip of insulation 150 attached to one of the members 146.

It will be seen that when field shaping members 146 are moved laterally to their outer positions 146a, their apertures 148 are respectively withdrawn from opening 128, as shown at dashed lines at 148a, thus permitting valve assembly 14 to be inserted in opening 128 and subsequently removed therefrom following the deforming operation.

Coils 130, 132 are preferably connected in series, but may be connected in parallel. Coils 130, 132 are coupled to a suitable pulse source 152 preferably comprising a capacitor bank and a firing circuit, such as that shown in U.S. Pat. No. 3,247,440, whereby the charge stored in the capacitor bank is discharged through coils 130, 132.

In accordance with the method of the invention, lower portion 66 of valve top member 18 having valve stem 22 and valve 20 assembled thereon is seated in cavity 30 in valve body 16, as abovedescribed. With field shaping plates 146 withdrawn to their positions 146a, valve assembly 14 is then inserted in opening 128 in magnetic forming apparatus 126, and field shaping plates 146 are then moved inwardly to their inner positions with the edges of apertures 148 engaging wall 26 of valve body 16, as shown in FIGS. 8 and 9. Pulse source 152 is then actuated, as by discharging its capacitor bank, thereby applying a momentary pulse of high amperage to low resistance coils 130, 132. Application of the high amperage surge of current to coils 130, 132 generates a rapidly expanding magnetic field of high intensity which, in turn, induces a transient current of high intensity in field shaping plates 146 which is concentrated on the inner edges around apertures 148, thus creating an intense magnetic field in wall 26 of valve body 16. The induced current pulse interacts with this magnetic field to produce a compressive force acting on wall 26 which thus deforms it into tight engagement with grooves 82 and splines 84 on lower portion 66 of valve top member 18, as seen in FIG. 7. Following application of the transient magnetic field of high intensity and resultant deformation of wall 26 of valve body 16 into engagement with lower portion 66 of valve top member 18, field shaping plates 146 are withdrawn to their positions 146a, and the assembled valve 14 is removed from apparatus 126 through opening 128.

The magnetic deformation method above may be employed in the assembly of other types of valves. Referring now to FIG. 11, a safety valve is shown having valve body 152 formed of suitable metal, such as brass of aluminum, and thin-walled cap member 154 formed of suitable conductive metal, such as brass or aluminum. Valve body 152 has a central aperture 156 formed therein extending between its lower, threaded end 158 and its upper end 160. Valve seat 162 is formed in upper end 160 and is normally engaged by valve member 164 biased to its closed position by spring 166. Annular groove 168 is formed in valve body 152 adjacent its upper end 160 and portion 170 of side wall 172 of thin-walled cap member 154 adjacent its lower end 174 is deformed into groove 168 by the forces created by a transient magnetic field of high intensity, as above-described.

Referring now to FIG. 12, a portion of a pressure relief valve is shown having body 176 formed of suitable metal, such as brass or aluminum, and thin-walled cap member 178 formed of suitable conductive metal, such as brass or aluminum. Valve body 176 has V-shaped groove 180 formed therein, and bottom end 182 of side wall 184 of cap member 178 is deformed into groove 180 thereby engaging tapered surface 186 thereof by magnetic deformation, as above-described.

It will now be seen that in accordance with the invention, a valve assembly is provided wherein valve parts are held in assembled relation without brazed, soldered or threaded connections.

While there have been described above the principles of this invention in connection with specific apparatus, it is to be clearly understood that this description is made only by way of example and not as a limitation to the scope of the invention.

What is claimed is:

1. In a valve assembly, a first part formed of conductive metal and having a relatively thin-wall deformable portion forming the side wall of an open ended cavity, said side wall initially having a smooth, uninterrupted surface, and a second part having a portion extending into said cavity, said second part portion having means thereon facing said wall for rigidly securing said first and second parts in assembled relation, said wall being deformed into tight engagement with said securing means by forces created by a transient magnetic field of high intensity, said first part comprising a valve body having a second portion with a chamber therein communicating with said cavity, said second body portion having at least one port therein communicating with said chamber, said second part comprising a valve top member with said portion thereof having a bottom end closing said chamber, said top member having a passage therethrough communicating with said chamber through said bottom end, said bottom end having a valve seat formed therein, said top member having a port therein communicating with said passage, a valve member in said chamber, and a valve stem extending through said passage and having said valve member secured thereto for actuating the same between a position engaging said seat thereby blocking flow between said ports, and a second position spaced from said seat thereby permitting flow between said ports.

2. In a valve assembly, a first part formed of conductive metal and having a relatively thin-wall deformable portion forming the side wall of an open ended cavity, said side wall initially having a smooth, uninterrupted surface, and a second part having a portion extending into said cavity, said second part portion having means thereon facing said wall for rigidly securing said first and second parts in assembled relation, said wall being deformed into tight engagement with said securing means by forces created by a transient magnetic field of high intensity, said first part comprising a valve body having a second portion with a chamber therein communicating with said cavity, said body having an axis extending through said cavity and chamber, said second body portion having first and second axially displaced ports therein communicating with said chamber and a valve seat in said chamber between said first and second ports, said second port comprising a valve top member with said portion thereof having a bottom end closing said chamber, said top member having a passage therethrough communicating with said chamber through said bottom end, and further comprising a valve member in said chamber, and a valve stem extending through said passage and having said valve member secured thereto for actuating the same between a first position engaging said seat thereby blocking flow between said ports, and a second position spaced from said seat thereby permitting flow between said ports.

3. In a valve assembly, a first part formed of conductive metal and having a relatively thin-wall deformable portion forming the side wall of an open ended cavity, said side wall initially having a smooth, uninterrupted surface, and a second part having a portion extending into said cavity, said second part portion having means thereon facing said wall for rigidly securing said first and second parts in assembled relation, said wall being deformed into tight engagement with said securing means by forces created by a transient magnetic field of high intensity, said valve being of the double seat type, said first part comprising a valve body having a second portion with a chamber therein communicating with said cavity, said body having an axis extending through said cavity and chamber, said second body portion having first and second axially displaced ports therein communicating with said chamber and a first valve seat in said chamber between said first and second ports, said second part comprising a valve top member with said portion thereof having a bottom end closing said chamber, said top member having a passage therethrough coaxial with said axis and communicating with said chamber, through said bottom end, said bottom end having a second valve seat formed therein, said top member having a third port therein communicating with said passage, and further comprising a valve member in said chamber between said first and second seats, and a valve stem extending through said passage and having said valve member secured thereto for actuating the same between a first position engaging said first seat thereby blocking flow between said first and second ports and permitting flow between said second and third ports, and a second position engaging said second seat thereby blocking flow between said second and third ports and permitting flow between said first and second ports.

4. The assembly of claim 3 wherein a portion of said valve stem axially spaced from said valve member has a threaded engagement with said passage thereby to actuate said valve member between said positions thereof, said third port communicating with said passage between said valve stem portion and said bottom end of said top member when said valve member is in said second position thereof.

5. The assembly of claim 4 wherein said third port is a second passage formed in a nipple projecting from a side of said top member, said second passage being inclined inwardly and downwardly toward said first-named passage and said bottom end of said top member.

6. The assembly of claim 3 wherein said holding means comprises a circumferential surface on said top member adjacent said bottom end which tapers axially inwardly in the direction away from said bottom end.

7. The assembly of claim 6 wherein said top member has a circumferential groove formed therein between said bottom end and said tapered surface, and further comprising an O-ring in said groove, said O-ring being engaged by said deformed wall and compressed thereby.

8. The assembly of claim 6 wherein said holding means further comprises axially extending grooves formed in said tapered surface.

9. In a double seat valve assembly, a valve body having a first thin-wall deformable portion forming the side wall of an open ended cavity and a second portion with a chamber therein communicating with said cavity, said side wall initially having a smooth, uninterrupted surface, said body having an axis entending through said chamber and cavity, said second body portion having first and second axially displaced ports therein communicating with said chamber and a first valve seat in said chamber between said first and second ports, a valve top member having a portion extending into said cavity with a bottom end closing said chamber, said top member portion having means thereon facing said wall for rigidly securing said body and top member in assembled relation, said wall being deformed into tight engagement with said securing means, said top member having a passage therethrough coaxial with said axis and communicating with said chamber through said bottom end, said bottom end having a second valve seat formed therein, said top member having a third port therein communicating with said passage, a valve member in said chamber between said first and second seats, and a valve stem extending through said passage and having said valve member secured thereto for actuating the same between a first position engaging said first seat thereby blocking flow between said first and second ports and permitting flow between said second and third ports, and a second position engaging said second seat thereby blocking flow between said second and third ports and permitting flow between said first and second ports.

10. The assembly of claim 9 wherein said holding means comprises a circumferential surface on said top member adjacent said bottom end which tapers axially inwardly in the direction away from said bottom end.

11. The assembly of claim 10 wherein said top member has a circumferential groove formed therein between said bottom end and tapered surface, and further comprising an O-ring in said groove, said O-ring being engaged by said deformed wall and compressed thereby.

12. The assembly of claim 10 wherein said holding means further comprises axially extending grooves formed in said tapered surface.

* * * * *